United States Patent [19]
Kielbania et al.

[11] Patent Number: 4,619,964
[45] Date of Patent: Oct. 28, 1986

[54] STABILIZED AQUEOUS COPOLYMER DISPERSIONS

[75] Inventors: Andrew J. Kielbania, Chalfont; Samuel S. Kim, Huntingdon Valley, both of Pa.

[73] Assignee: Rohm and Haas Company, Philadelphia, Pa.

[21] Appl. No.: 538,459

[22] Filed: Oct. 3, 1983

[51] Int. Cl.[4] ............... C08F 2/22; C08F 267/00
[52] U.S. Cl. ......................... 524/460; 524/458; 524/558; 524/815; 524/816; 524/817; 524/832; 524/833; 525/301; 525/328.8; 526/318
[58] Field of Search .............. 524/832, 833, 815, 460, 524/901, 558, 816, 817, 458; 525/328.8, 301; 526/318

[56] References Cited
U.S. PATENT DOCUMENTS

| | | | |
|---|---|---|---|
| 3,063,969 | 11/1962 | Stephens | 526/318 |
| 4,098,970 | 7/1978 | Hahn | 525/328.8 |
| 4,100,047 | 7/1978 | McCarty | 524/832 |
| 4,139,437 | 2/1979 | Araki | 524/824 |
| 4,148,988 | 4/1979 | Matsuhara | 526/318 |
| 4,195,004 | 3/1980 | Van Acker | 525/328.8 |
| 4,419,496 | 12/1983 | Hinton | 524/460 |
| 4,478,974 | 10/1984 | Lee | 525/301 |
| 4,501,845 | 2/1985 | Baus | 524/460 |

*Primary Examiner*—C. Warren Ivy
*Attorney, Agent, or Firm*—Douglas E. Winters; Alex R. Sluzas

[57] ABSTRACT

This invention relates to water insoluble copolymer aqueous dispersions stabilized by multiple carboxylic acid functional comonomer residues against shear-induced coagulation. These copolymer dispersions are useful as pressure sensitive adhesives, and as binders for textiles, paper, non-woven materials, and coatings.

15 Claims, No Drawings

STABILIZED AQUEOUS COPOLYMER DISPERSIONS

BACKGROUND OF THE INVENTION

1. Field of the Invention

This invention relates to aqueous dispersions of water insoluble copolymers stabilized by multiple carboxylic acid functional comonomer residues against coagulation resulting from mechanical shear. These compositions display improved mechanical stability in comparison with dispersions stabilized by monocarboxylic acid functional comonomer residues. These compositions are useful as pressure sensitive adhesives and as binders for textiles, paper, nonwoven materials, and coatings.

2. Brief Description of the Prior Art

Aqueous dispersions of water insoluble copolymers which are stabilized by chemically bound carboxyl groups are known to exhibit better mechanical stability, freeze-thaw stability, and pigment compatibility than dispersions stabilized only with physically adsorbed soaps. K. Sakota and T. Okaya, *J. of Applied Poly. Science,* 20 1735-1744 (1976). The stability of dispersions carboxylated by the inclusion of monocarboxylic acid functional comonomer has been investigated as a function of polymerization process. K. Sakota and T. Okaya, *J. of Applied Poly. Science,* 21 1025-1034 (1977); 20 2583-2587 (1976). It is known that surface bound acid is more effective in promoting stability than acid buried within the latex particles. D. R. Vijayendran, *J. of Poly. Science,* 23 893-11 (1979), has shown that the hydrophobicity of the carboxylic acid functional comonomer relative to that of the comonomers is important in determining to what extent the carboxylic acid functional comonomer will be buried or surface bound in the latex particle or will fail to incorporate into the latex particle altogether. It was found that a dicarboxylic acid functional comonomer, itaconic acid, largely failed to incorporate into a polystyrene latex in comparison with the more hydrophobic monocarboxylic acid functional comonomers, methacrylic and acrylic acids. In addition to the effect on mechanical stability, the nature of the carboxylic acid functional comonomer can affect a variety of other properties of the latex particle and films formed by coalescing latex particles. K. L. Hoy, *J. of Coatings Technology,* 51 27-41 (1981).

Monocarboxylic acid functional monomers such as acrylic and methacrylic acid are well known as constituents of pressure sensitive adhesive compositions. H. Warson, *The Applications of Synthetic Resin Emulsions,* 312 (1972). D. Satas, *Handbook of Pressure Sensitive Adhesive Technology,* 299-305 (1982). Similarily, the use of dicarboxylic acid functional comonomers such as maleic, fumaric, crotonic, itaconic, and citraconic acids and corresponding anhydrides such as maleic, itaconic and citraconic anhydrides, as constituents of pressure-sensitive adhesives, is known to the art.

In order to be useful as or in formulating pressure sensitive adhesives (PSAs), it is desirable that copolymers be tacky at the temperature of use. Assuming constant molecular weight and the absence of unreacted comonomer, solvent and plasticizer, tackiness can be achieved by selecting a copolymer composition displaying a low glass transition temperature ($T_g$). A $T_g$ below 0° C. is desirable for adhesives which are to be used at or near room temperature. In acrylic and other adhesives in which low copolymer $T_g$ is achievable be selecting comonomers with relatively long alkyl side chains (e.g., alkyl esters of acrylic and methacrylic acids), low $T_g$ copolymer is characterized by relatively great hydrophobicity. Prior art difunctional carboxylic acids are relatively hydrophilic and may consequently be difficult to incorporate in tacky, hydrophobic PSA copolymers.

The multifunctional acid comonomers of the present invention are useful in stabilizing hydrophobic PSA copolymers.

Latex rheological properties are sensitive to the incorporation of ionizable comonomers such as carboxylic functional monomers. For example, W. J. Lee, in U.S. Pat. No. 3,458,466, granted July 29, 1969, discloses latex compositions having improved rheological properties prepared from a comonomer composition comprising from about 1 to 10% of an alpha, beta-monoethylenically unsaturated mono- or polycarboxylic acid monomer having from 3 to 8 carbon atoms.

In one embodiment of this invention, a multifunctional acid anhydride is reacted with a hydroxyalkyl(-meth)acrylate to yield comonomer useful in practicing the invention. The reaction of an alcohol functional compound with an anhydride is well known in the chemical art. For example, D. H. Clemens in U.S. Pat. No. 3,150,118, granted Sept. 22, 1964, discloses unsaturated acidic monomers produced by heating a hydroxyalkyl acrylate or methacrylate with maleic, succinic, or phthalic anhydride. Copolymers containing from about ¼ to 10% by weight of the acidic monomers are disclosed to be particularly useful in the production of emulsion and solution coating materials.

Some of the preferred comonomers employed in the present invention are known in the chemical art. For example, I. H. McEwan in Canadian Patent No. 729,729, issued Mar. 8, 1966, discloses copolymers comprising copolymerized ethylenically unsaturated esters of the formula

$$X-C(O)O-CHY-C(Z)=CH_2$$

wherein X is an organic radical containing at least one free hydroxyl or carboxyl group and each of Y and Z is selected from the group consisting of hydrogen, halogen, hydroxyl and alkyl radicals of up to three carbon atoms. Examples of such comonomers are the allyl, methallyl, chloroallyl, hydroxyallyl and 1-penten-3-yl esters of acids such as succinic, glutaric, adipic, phthalic, mellitic, and trimellitic acids. Coating compositions containing a copolymer prepared with such acid functional monomer and a crosslinking agent and preferably a crosslinking catalyst are disclosed.

P. J. Pare in U.S. Pat. No. 3,207,765, granted Sept. 21, 1965, discloses a process for the production of vinyl trimellitates and polyester resins containing such trimellitates which may be crosslinked by admixing with an alpha, beta-unsaturated polymerizable monomer such as styrene, allylmethacrylate, or triallylphosphate and an optional peroxide catalyst.

J. R. Stephens and R. E. Van Strien in U.S. Pat. No. 3,063,969, granted Nov. 13, 1962, disclose 4-vinyltrimellitate and 4-vinyltrimellitate anhydride as well as polymers and copolymers prepared using these monomers which are useful for coatings and thermosetting resins.

H. Yasuno et al. in U.S. Pat. No. 4,250,007, granted Feb. 10, 1981, discloses a photosetting composition useful as a coating varnish comprising a modified, epoxidized butadiene polymer comprising 5-50 aromatic or cycloaliphatic polybasic carboxylic ester side chain groups per 100 butadiene units, each having at least one acryloyl or methacryloyl terminal group and a linking group formed by a reaction between the carboxylic radical in the polybasic carboxylic acid and an epoxy radical in the epoxidized butadiene polymer. Polybasic carboxylic acid compounds prepared from condensation from 2-hydroxyethyl acrylate and phthalic anhydride, 2,3,3',4-biphenyltetracarboxylic dianhydride, and trimellitic anhydride are also disclosed.

Y. Taneda et al. in U.S. Pat. No. 3,695,877, granted Oct. 3, 1972, disclose photopolymerizable resin compositions comprising unsaturated polyester obtained by polycondensation of an acid component comprising (1) at least 5 mole percent (with respect to the total acid component) of aromatic polycarboxylic acid containing at least 3 carboxylic groups or functional derivatives thereof and (2) at least 30 mole percent (with respect to the total acid component) of ethylenically unsaturated dicarboxylic acid or functional derivative thereof. A number of tricarboxylic acid functional aromatic compounds such as hemimellitic acid, trimellitic acid, 2,4,5-toluene tricarboxylic acid, pyromellitic acid and 1,2,4-naphthalene tricarboxylic acid are also disclosed.

E. Masuhara et al. in *Reports of the Institute for Medical and Dental Engineering*, 13, 21–25 (1979) disclose the preparation of 4-methacryloxyethyl trimellitic anhydride and its use as a comonomer with methylmethacrylate to improve adhesion between polymethyl methacrylate rod and hard tissue such as human enamel.

SUMMARY OF THE INVENTION

One of the objects of this invention is to provide water insoluble copolymer aqueous dispersions with increased stability against coagulation resulting from mechanical shear. Another object of the invention is to provide aqueous dispersions of water insoluble copolymers useful as pressure sensitive adhesives with enhanced adhesion. Another object of this invention is to provide aqueous dispersions of water insoluble copolymers which can be stabilized against coagulation using a low level of surfactant. Another object of this invention is to provide aqueous dispersions of water insoluble copolymers useful in formulating pressure sensitive adhesive compositions which exhibit good mechanical stability against shear induced coagulation and greater adhesion relative to prior art pressure sensitive adhesive emulsions. Still another object of this invention is to provide aqueous dispersions of water insoluble copolymers prepared by a multiple stage (i.e. two or more stages) polymerization process in which the major fraction of the monomer mixture added during the final stage of the polymerization process consists of a monomer the corresponding homopolymer of which has a glass transition temperature of at least 70° C., such as styrene, alpha-methyl styrene, or vinyl toluene, which exhibit increased mechanical stability. Yet another object of this invention is to provide aqueous dispersions of water insoluble copolymers prepared by a multiple stage polymerization process in which the major proportion of the monomer mixture added during the final stage of the polymerization process consists of at least one monomer selected from styrene, alpha-methyl styrene, and vinyl toluene, which exhibits enhanced adhesion. These and other objects of the invention, which will become apparent below, are met by this invention. The polymer compositions of this invention are vinyl addition emulsion copolymers comprising a minor portion of a residue of at least one optionally substituted compound selected from the carboxylic acid anhydrides of benzene, naphthalene, biphenyl, and the ($C_5$–$C_{10}$) cyclo- and bicyclo-alkanes and alkenes and the corresponding acids, provided that no residue bear fewer than two nor more than four carboxylic acid groups and provided that at least some portion of the compound or compounds bearing such residue or residues is not present in the monomer mixture in which polymerization is first initiated.

DETAILED DESCRIPTION OF THE INVENTION

The compositions of this invention are vinyl addition emulsion polymers comprising a minor portion by weight of a residue of at least one optionally substituted compound selected from the carboxylic acid anhydrides of benzene, naphthalene, biphenyl and the ($C_5$–$C_{10}$) cyclo- and bicyclo-alkanes and alkenes and the corresponding acids, provided that no residue bear fewer than two nor more than four carboxylic acid groups (multi acid functional monomer), and provided that at least some portion of the compound or compounds bearing such residue or residues is not present in the monomer mixture in which polymerization is first initiated.

This latter requirement implies that some portion of the multi acid functional monomer is added to the polymerization mix at some time after polymerization is first initiated. The addition may be made gradually or in discrete increments (batchwise). The multi acid functional monomer or monomers may be added alone or as part of a monomer mixture, containing other ethylenically unsaturated monomers and optionally including water, cosolvent, emulsifiers, surfactants and additives.

A "minor portion" is less than 50%.

Preferably, the compositions of the instant invention are vinyl addition emulsion polymers comprising a minor portion by weight of a residue of at least one compound selected from the carboxylic acid anhydrides of benzene, naphthalene, biphenyl and the ($C_5$–$C_{10}$) cyclo- and bicyclo-alkanes and alkenes and the corresponding acids, optionally substituted with up to three substituents selected from halogen, nitro, cyano, ($C_1$-$C_6$)alkyl, ($C_3$–$C_6$)alkenyl, ($C_1$–$C_3$)alkoxy, hydroxy, thio, amino, —$CO_2H$, -($C_1$–$C_6$)alkylhydroxy, mono($C_1$–$C_4$)alkylamino and di($C_1$–$C_3$)alkylamino, provided that no residue bear fewer than two nor more than four carboxylic acid groups, and provided that at least some portion of the compound or compounds during such residue or residues is not present in the monomer mixture in which polymerization is first initiated.

In another preferred embodiment the compositions of the instant invention are comprised of vinyl addition polymers comprising a minor portion by weight of a residue of the reaction product of at least one compound selected from the carboxylic acids of benzene, naphthalene, biphenyl and the ($C_5$–$C_{10}$) cyclo- and bicyclo-alkanes and alkenes, substituted with up to two substituents selected from —OH, —SH, -($C_1$–$C_6$)alkylhydroxy and -($C_1$–$C_4$)alkylthio, optionally substituted with up two substituents selected from halogen, nitro, cyano, ($C_1$–$C_6$)alkyl, ($C_3$–$C_6$)alkenyl, amino, —$CO_2H$, mono($C_1$–$C_4$)alkylamino and di($C_1$–$C_4$)alkylamino, and an ethylenically unsaturated comonomer bearing a carboxylic acid or carboxylic acid anhydride group, provided that no residue bear fewer than two nor more than four carboxylic acid groups, and provided that at least some portion of the compound or compounds bearing such residue or residues is not present in the monomer mixture in which polymerization is first initiated.

In a preferred embodiment the reaction product is an ester derived from a carboxylic acid anhydride or corresponding acid of benzene and a hydroxy($C_1$–$C_5$)alkyl acrylate or methacrylate. Still more preferred is the embodiment in which the residue is the reaction product of pyromellitic anhydride and hydroxyethyl methacrylate. Another more preferred embodiment employs the reaction product of pyromellitic anhydride and hydroxypropyl methacrylate.

In another embodiment the reaction preduct is an ester derived from bicyclo[2.2.2]oct-7-ene-2,3,5,6-tetracarboxylic-dianhydride and a ($C_1$–$C_4$)alkyl acrylate or methacrylate, preferably hydroxyethyl or hydroxypropyl methacrylate.

It is preferred that the reaction product comprises from about 0.2 to about 10% by weight of the total monomer mixture.

The preparation of vinyl addition polymers by emulsion processes is well known to the art. An extensive and detailed account of emulsion polymerization may be found in D. C. Blakley, *Emulsion Polymerization* (John Wiley & Sons, 1975). The vinyl addition copolymer compositions of the instant invention may be copolymerized with water-insoluble and partially water soluble monomers by an emulsion technique in which the comonomers are emulsified by nonionic, cationic or anionic emulsifiers or suitable mixtures thereof. Copolymerization is effected with the aid of a free radical initiator or catalyst, such as an organic or inorganic peroxide catalyst, a hydroperoxide catalyst, peroxy catalysts, such as persulfates, and/or an azo catalyst. It is preferred that either a gradual addition or multistep process be employed. In a gradual addition process polymerization is initially initiated in a fraction of the total amount of monomer to be employed during the course of the polymerization. The remainder of the monomer is gradually added as the polymerization proceeds. The composition of the monomer mixture which is gradually added to the polymerization vessel need not be the same as that in which the copolymerization is first initiated. The composition of the monomer mixture to be added may itself change as the mixture is added. The monomer constituents of the monomer mixtures may be emulsified prior to addition. Monomer mixtures may contain one or more monomer components. Several different monomer mixtures may be added to the polymerization locus simultaneously. In a multistate polymerization the addition of monomer to the polymerization vessel is interrupted at least once. These periods of interruption mark the bounds of the various steps of the process.

In one preferred embodiment of this invention, a two-stage emulsion polymerization process is employed. Essentially all of the monomer bearing the multiple carboxylic acid groups may be added to the monomer solution or emulsion which may be continuously cofed with solutions which generate free radicals in the polymerization locus. This monomer solution may also contain at least one other monomer, the corresponding homopolymer of which displays a glass transition temperature of at least 70° C. ("high Tg monomer"), such as styrene, alpha-methylstyrene, or vinyl toluene. Styrene is preferred in this embodiment. The preferred proportion of high Tg monomer is from 5 to 20 weight percent of the total weight of polymer, with 7 to 15 weight percent more preferable. The preferred proportion of multi acid functional monomer is from 2 to 8 weight percent.

A polymerization process may be employed which results in a core-shell polymer structure. Core-shell polymers and their preparation are discussed, for example, in U.S. Pat. No. 4,107,120, granted Aug. 15, 1978, to J. E. Plamondon et al., in U.S. Pat. No. 3,655,825, granted Apr. 11, 1972 to L. C. Souder et al. and in U.S. Pat. No. 3,426,101, granted Feb. 4, 1969 to C. F. Ryan et al., all hereby incorporated by reference.

Examples of emulsifiers or surfactants suited to the polymerization processes of the present invention include alkali metal and ammonium salts, alkyl, aryl, alkaryl and aralkyl sulfonates, sulfates and polyether sulfates and the corresponding phosphates and phosphanates; and ethoxylated fatty acids, esters, alcohols, amines, amides and alkyl phenols.

Chain transfer agents including mercaptans, polymercaptans and polyhalogen compounds may be used in the polymerization mixture.

The multicarboxylic acid residues of the instant invention may be borne by comonomers which are consumed during the polymerization process or alternatively, the residues may be borned by compounds which are chemically reacted with the copolymers of the invention subsequent to the completion of some portion of the polymerization process.

In one preferred embodiment of the invention the multicarboxylic acid residues are borne by alpha, beta-ethylenically unsaturated comonomers which are copolymerized during the preparation of the copolymer compositions of the invention. One preferred class of comonomers consists of the reaction products resulting from the condensation of hydroxyalkyl(meth)acrylates and the carboxylic acid anhydrides of benzene, naphthalene, biphenyl and the ($C_5$–$C_{10}$) cyclo- and bicycloalkanes and alkenes and the corresponding acids. These latter compounds may be substituted with up to three substituents selected from halogen, nitrogen, cyano, ($C_1$–$C_6$)alkyl, ($C_3$–$C_6$)alkenyl, ($C_1$–$C_3$)alkoxy, hydroxy, thio, amino, —$CO_2H$, -($C_1$–$C_6$)alkylhydroxy, mono($C_1$–$C_4$)alkylamino, and di($C_1$–$C_3$)-alkylamino. The residue of the acid or anhydride must bear no fewer than two nor more than four carboxylic acid groups.

In another preferred embodiment of this invention the hydroxyalkyl(meth)acrylate is first copolymerized. The resulting copolymer is subsequently condensed with at least one compound selected from the carboxylic acid anhydrides of benzene, naphthalene, biphenyl and ($C_5$–$C_{10}$)cycloalkane and their corresponding acids.

In another embodiment of this invention the acrylate and methacrylate acid monoester of

in which n may be 1 to 50, preferably 1 to 20, and more preferably 1 to 10, is reacted with at least one compound selected according to this invention from the carboxylic acid anhydrides of benzene, naphthalene, biphenyl and the ($C_5$–$C_{10}$)cycloalkanes and the corresponding acids. The resulting condensation product is then copolymerized to produce compositions of this invention.

In another embodiment of this invention at least one monomer selected from the class represented by the formula

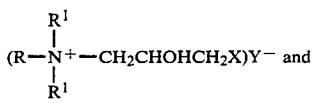

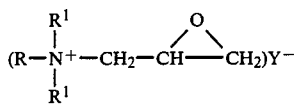

wherein

R is an ethylenically unsaturated organic group,

R$^1$ is linear (C$_1$–C$_4$)alkyl, optionally hydroxy substituted;

X is Cl, Br or I, and

Y is an anion;

is reacted with at least one compound selected from the carboxylic acid anhydrides of benzene, naphthalene, biphenyl, and the (C$_5$–C$_{10}$)cyclo- and bicyclo-alkanes and alkenes and their corresponding acids. The unsaturated quaternary monomers employed in this embodiment are well known in the art. The preparation of one class of these compounds derived from acrylic or methacrylic acid is described in U.S. Pat. No. 3,678,098 which is herein incorporated by reference. Quaternary ammonium monomers of this invention are taught by U.S. patent applications Ser. No. 391,659, filed June 24, 1982, now U.S. Pat. No. 4,420,583, and Ser. No. 291,010, filed Aug. 7, 1981, now abandoned in favor of Ser. No. 513,951 filed July 15, 1983, by T. W. Hutton, assigned to a common assignee with the instant application and herein incorporated by reference.

Acrylic or methacrylic acid esters having up to 18 carbon atoms may be included in the polymerization monomer mixture. These alkylmethacrylates and acrylates have an average of from 1 to about 18 carbon atoms in the alkyl groups, and include methyl methacrylate, ethyl acrylate, butyl acrylate, butyl methacrylate, and hexyl acrylate, heptyl acrylate, octyl methacrylate, nonyl acrylate, decyl acrylate, and the various isomers of these acrylates and methacrylates such as isooctyl acrylate. 2-ethylhexylacrylate may also be used. Higher alkylacrylates and methacrylates, such as dicyclopentenyl oxyalkyl acrylates and methacrylates, can be used, particularly in combination with lower acrylates and methacrylates.

The copolymer compositions of this invention are especially useful in applications such as pressure sensitive adhesives, binders for textiles, non-woven materials and coatings, in which a low-glass transition polymeric binder is desirable. For example, as is known in the art, the glass transition temperature (T$_g$) of the polymer used to prepare a pressure sensitive adhesive is preferred to be below 0° C. in order for the composition to exhibit tack at room temperature.

Glass transition temperature is a conventional criterion of polymer hardness and is described by Flory, *Principals of Polymer Chemistry* (Cornell University Press, 1953) 56–57. The T$_g$ of a copolymer of any specific composition can be approximately calculated from the T$_g$s of the corresponding homopolymers. Fox, *Bull. Am. Physics Soc.*, 1, 3, at 123 (1956). The preferred monomers can be blended to give the desired T$_g$ of the copolymer. Most of the esters of acrylic acid and methacrylic acid having a low T$_g$ are well known in the pressure sensitive adhesive art as monomers which can confer tack on the corresponding polymer.

EXAMPLE A

Preparation of Multicarboxylic Acid Functional Monomer (HEMA.BTC)

A mixture of 57.6 g (0.30 moles) of 1,2,4-benzene tricarboxylic anhydride, 41.5 g (0.30 moles) hydroxyethyl methacrylate (94%) and 5 drops concentrated sulfuric acid is stirred and heated to 110°–120° C. After 30 minutes at 110°–120° C. the mixture becomes very viscous and is allowed to cool at room temperature. The solid product is dissolved in aqueous ammonia (approximately 40%) to be used for emulsion polymer preparation.

EXAMPLE 1

Preparation of Emulsion Polymer (BA/EA/AOPA/HEMA.BTC-61.8/25.8/6.2//6.2)

A reaction flask equipped with mechanical stirer, reflux condenser, thermometer and suitable ports is flushed with nitrogen for 15 minutes. The flask is charged with 450 parts water, 0.43 parts sodium carbonate, 0.48 parts sodium dodecylbenzenesulfonate, 2.8 parts ammonium persulfate and is heated to 80°–83° C. In a separate vessel a monomer emulsion is prepared as follows:

200 parts water
3.7 parts sodium dodecylbenzenesulfonate
539 parts BA
224 parts EA
54 parts AOPA The monomer emulsion and catalyst cofeed consisting of 1.3 parts ammonium persulfate and 50 parts water are added continuously to the flask for 2 hrs. while maintaining the reaction temperature at 80°–83° C. Upon completion of the additions the temperature is maintained at 80°–83° C. for 15 minutes and then cooled to 55°–60° C. In a separate vessel a second monomer solution is prepared as follows:

30 parts water
48 parts HEMA.BTC (56%)
20 parts 28% aqueous ammonia

A solution of 6 parts FeSO$_4$.7H$_2$O (0.15%) aqueous solution and 2 parts of 1% aqueous tetrasodium salt of ethylenediamine tetraacetic acid solution are added to the reaction flask.

The second monomer solution is then continuously cofed for 20 minutes into the reaction flask with solution of 0.4 parts ammonium persulfate in 15 parts water and 0.4 parts sodium metabisulfite in 15 parts water while maintaining the reaction temperature at 55°–60° C. Upon completion of these additions 0.2 parts t-butylhydroperoxide in 5 parts water and 0.12 parts sodium formaldehyde sulfoxylate in 5 parts of water are added to the reaction. After 10 minutes the emulsion is cooled to room temperature and filtered. The emulsion has 46.1% solids and is Example 6 in Table I below.

Pressure Sensitive Adhesive and Emulsion Test Procedures

The pressure sensitive adhesive (PSA) emulsion polymers are knife-coated onto 1 mil Mylar ® or 1 ml corona-treated polypropylene to a wet thickness of 3–4 mils. The coated Mylar ® film is dried in an air circulating oven for 15 minutes at 250° F. while a coated polypropylene film is dried for 15 minutes at a 150° F. The dried adhesive coatings are approximately 1 mil thick. The coated films are conditioned for 18 hours and tested at 25° C. temperature and 50% relative humidity.

Peel adhesion tests are performed using Test No. PSTC-1 of the Pressure Sensitive Tape Council. Shear adhesion is performed using PSTC-7. Peel values for 1 and 20 minutes dwell time and shear resistance values for ½ square inch are reported in Table II below. Rolling ball tack is tested using PSTC-6. Polyken tack is tested using a Polyken tack testing machine.

Latex mechanical stability results in Table I are determined by a qualtitative finger rub test. Three to four drops of emulsion are placed on an aluminum panel and vigorously rubbed with an index finger while extending as much downward pressure as possible. A poor rating results if the emulsion immediately breaks and coagulates on the panel and/or finger. A fair rating denotes that the emulsion survives approximately 1-5 seconds. An excellent rating is given to an emulsion which cannot be coagulated and remain stable until it begins to dry.

The following abbreviations are used in describing the comonomer composition of the polymers of this invention.

| Abbreviation | Monomer |
|---|---|
| BA | Butyl acrylate |
| EA | Ethyl acrylate |
| St | Styrene |
| AOPA | Acryloxypropanoic acid |
| HEMA | Hydroxyethylmethacrylate |

| Abbreviation | Monomer |
|---|---|
| BTC | 1,2,4-benzenetricarboxylic acid |
| HEMA.BTC | Ester of HEMA and BTC |
| MAA | methacrylic acid |
| VAC | vinyl acetate |
| AA | acrylic acid |
| MMA | methyl methacrylate |

Latex Emulsion Properties

Table I presents the composition and physical properties of a series of emulsions prepared substantially according to the process described above for Example 1. The Comparative Examples omit the second stage addition of the multi acid functional monomer. Comparison of the results obtained in the finger rub stability test for the Examples with the corresponding Comparative Examples indicates that the addition of the second stage multi acid functional monomer is generally effective in promoting latex stability.

TABLE I
LATEX EMULSION PROPERTIES

| Example | Composition | Calc Tg | % Solids | Finger Rub Test |
|---|---|---|---|---|
| Comp. Ex. 1 | 76 EA/22 MMA/2 AA | 0 | 50.2 | Fair |
| Example 1 | 73 EA/21 MMA/2 AA//4 HEMA-BTC | | 43.6 | Excellent |
| Comp. Ex. 2 | 57.5 EA/40.5 MMA/2 AA | 20 | 50.2 | Excellent |
| Example 2 | 55.2 EA/38.8 MMA/2 AA//4 HEMA-BTC | | 44.0 | Excellent |
| Comp. Ex. 3 | 34. EA/64 MMA/2 AA | 50 | 50.1 | Excellent |
| Example 3 | 32.6 EA/61.4 MMA/2 AA//4 HEMA-BTC | | 44.1 | Excellent |
| Comp. Ex. 4 | 98 EA/2 AA | −20 | 49.8 | Very Poor |
| Example 4 | 94 EA/2 AA//4 HEMA-BTC | | 43.5 | Excellent |
| Comp. Ex. 5 | 98 BA/2 AA | −52 | 49.6 | Poor |
| Example 5 | 94 BA/2 AA//4 HEMA-BTC | | 43.5 | Excellent |
| Comp. Ex. 6 | 66 BA/27.4 EA/6.6 AOPA | −40 | 52.2 | Fair |
| Example 6 | 61.8 BA/25.8 EA/6.2 AOPA//6.2 HEMA-BTC | | 46.1 | Excellent |
| Comp. Ex. 7 | 68.8 BA/29 EA/2.2 AA | −44 | 52.4 | Fair |
| Example 7 | 64.6 BA/27.2 EA/2 AA//6.2 HEMA-BTC | | 46.2 | Excellent |
| Comp. Ex. 8 | 18.35 EA/79.5 VAC/2.15 AA | 20 | 51.4 | Very Good |
| Example 8 | 18 EA/78 VAC/2 AA//2 HEMA-BTC | | 42.9 | Very Good |
| Comp. Ex. 9 | 97.9 EA/2.1 MAA | −19 | 52.6 | Very Poor |
| Example 9 | 91.8 EA/2 MAA//6.2 HEMA-BTC | | 46.3 | Gelled |

Adhesive Performance Test Results

The results of peel strength, shear resistance and tack tests for Examples and Comparative Examples 6 and 7 are given in Table II for polypropylene substrate.

Comparison of the results obtained for Examples 6 and 7 with those of Comparative Examples 6 and 7 indicates that a second stage of HEMA.BTC improves shear resistance without adversely affecting peel adhesion or tack.

TABLE II
ADHESIVE PERFORMANCE TEST RESULTS

| | 180° Peel (oz/in[1]) Dwell Time | | Shear[1] (hrs. ½ SQ IN) | Rolling Ball Tack (mm) | Polyken Tack (gms) | Finger[2] Tack |
|---|---|---|---|---|---|---|
| | (1 min) | (20 min) | | | | |
| Comp. Example 6 | 61.6, C. | 59.1, C. | .3, C. | 44 | 657 | E+ |
| Example 6 | 55.1, A | 71.4, A/M | 7.3, M | 55 | 652 | E |
| Comp. Example 7 | 63.9, C. | 61.6, C. | .2, C. | 46 | 575 | E+ |

TABLE II-continued

| | ADHESIVE PERFORMANCE TEST RESULTS | | | | | |
|---|---|---|---|---|---|---|
| | 180° Peel (oz/in[1]) Dwell Time | | Shear[1] (hrs. ½) | Rolling Ball | Polyken Tack | Finger[2] |
| | (1 min) | (20 min) | SQ IN | Tack (mm) | (gms) | Tack |
| Example 7 | 67.4, C. | 67.8, C. | 2.0, C. | 56 | 615 | E E+ |

[1]C = cohesive mode failure; A = adhesive failure;
M = mixed adhesive and cohesive mode failure;
[2]E = excellent Paper Roll Towel Binder Paper roll towels employing the described polymers or binders are prepared and tested as follows:

Two 18" lengths of #4 Whatman Chromatographic paper are cut for each sample. These are conditioned at 72° F. and 50% RH for 30 min. The conditioned paper is then weighed to obtain tare weight.

The emulsion polymers are formulated with 2% (solids on solids) Aerotex M-3 ® and 1.5% (solids on solids) $NH_4NO_3$. The formulated latex is then diluted with water to 5% solids. For comparison the emulsion polymer is diluted with water to 5% solids and contains no aminoplast or catalyst. In each case 1 pint of 5% solids latex is prepared.

The paper in the binder is dipped and fed through the rollers of a Birch padder. The paper is dried at 210° F. for 5 min. All sheets are cured at 300° F. for 3 min.

The sheets are conditioned at 72° F. and 50% RH for 18 hrs to allow for moisture pick up. The paper sheets are reweighed to determine % add on. Each sheet is cut to ten 1"×6" strips, four for dry tensile measurements and six for wet tensile measurements. A Thwing-Albert Intellect 500 tensile tester is used for dry and wet tensile measurements as follows:

Gap between jaws: 4 inches
Crosshead speed: 2"/min
Calibration: 50 Kg full scale load for dry tensile; 5000 g full scale load for wet tensile.

All samples are elongated to break. The wet tensile strips are immersed in 1% aqueous OT ® surfactant solution for 15 seconds before testing. Maximum stress of each sample is read and recorded to the nearest gram. The average of twelve replicates is reported as the wet tensile and the average of eight replicates is reported as the dry tensile strength in grams per inch of width.

The tensile strengths are shown in Table III below.

TABLE III

| | Paper Roll Towel Tensile Strength | | | |
|---|---|---|---|---|
| Sample | % Add On | Catalyst and Aerotex M-3 Present | Tensile Strength | |
| | | | Dry | Wet |
| Comparative Example I | 5.3 | No | 4287 | 119 |
| Example I | 3.1 | Yes | 4216 | 635 |
| Comparative Example II | 5.4 | No | 4510 | 113 |
| Example II | 3.1 | Yes | 4620 | 653 |

These results indicate that the acid containing copolymer of this invention exhibit tensile strengths typical of paper towel binders. Wet tensile strengths are greatly improved by the presence of an aminoplast (Aerotex M-3) and $NH_4NO_3$ catalyst.

We claim:

1. An aqueous latex of a water insoluble vinyl addition polymer prepared by emulsion polymerization comprising a minor portion by weight of the polymer of a residue of at least one optionally substituted compound selected from the carboxylic acid anhydrides of benzene, naphthalene, biphenyl and the ($C_5$-$C_{10}$) cycloalkanes and the corresponding carboxylic acids of benzene, naphthalene, biphenyl and the ($C_5$-$C_{10}$) cycloalkanes, provided that no residue bear fewer than two but not more than four carboxylic acid groups, and provided that at least some portion of the compound or compounds bearing such residue or residues is not present in the monomer mixture in which polymerization is first initiated.

2. An aqueous latex according to claim 1 comprising a minor portion by weight of a residue of at least one compound selected from the carboxylic acid anhydrides of benzene, naphthalene, biphenyl and the ($C_5$-$C_{10}$)cycloalkanes and the corresponding carboxylic acids of benzene, naphthalene, biphenyl and the ($C_5$-$C_{10}$)cycloalkanes, optionally substituted with up to three substituents selected from halogen, nitro, cyano, ($C_1$-$C_6$)alkyl, ($C_3$-$C_6$)alkenyl, ($C_1$-$C_3$)alkoxy, hydroxy, thio, amino, —$CO_2H$, —($C_1$-$C_6$)alkyl hydroxy, mono($C_1$-$C_4$)alkylamino and di($C_1$-$C_3$)alkylamino, provided that no residue bear fewer than two nor more than four carboxylic acid groups, and provided that at least some portion of the compound or compounds bearing such residue or residues is not present in the monomer mixture in which polymerization is first initiated.

3. An emulsion polymer comprising a minor portion by weight of a residue of the reaction product of at least one compound selected from the carboxylic acid anhydrides of benzene, naphthalene, biphenyl, and the ($C_5$-$C_{10}$)cycloalkanes and the corresponding carboxylic acids of benzene, naphthalene, biphenyl and the ($C_5$-$C_{10}$)cycloalkanes, optionally substituted with up to three substituents selected from halogen, nitro, cyano, ($C_1$-$C_6$)-alkyl, ($C_3$-$C_6$)alkenyl, ($C_1$-$C_3$)alkoxy, hydroxy, thio, amino, —$CO_2H$, —($C_1$-$C_6$)alkylhydroxy, mono($C_1$-$C_4$)alkylamino and di($C_1$-$C_4$)alkylamino, and an ethylenically unsaturated comonomer selected from the group consisting of hydroxy ($C_1$-$C_6$), alkyl (meth)acrylates, the acrylic and methacrylic acid monoesters of $HO(CH_2CH_2O)_nH$ and $HO[CH(CH_3)CH_2O]_nH$, in which n is 1 to 5, glycidyl methacrylate, N-methylolacrylamide, N-methylolmethacrylamide,

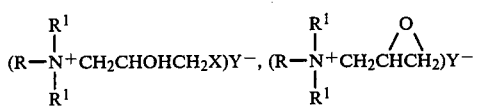

wherein
R is an ethylenically unsaturated organic group, $R^1$ is linear ($C_1$-$C_4$)alkyl, optionally hydroxy substituted; X is Cl, Br or I, Y is an anion,
provided that no residue bear fewer than two nor more than four carboxylic acid groups, and provided that at least some portion of the compound or compounds bearing such residue or residues is not present in the monomer mixture in which polymerization is first initiated.

4. An emulsion polymer according to claim 3 in which the reaction product is an ester derived from a carboxylic acid anhydride or corresponding acid of benzene and a hydroxy($C_1$-$C_5$)alkyl acrylate or methacrylate.

5. An emulsion polymer according to claim 4 in which the carboxylic acid anhydride is promellitic anhydride and the hydroxyalkyl methacrylate is hydroxyethyl methacrylate.

6. An emulsion according to claim 3 prepared by a two-stage semicontinuous batch process in which all of the reaction product and no more than 75% by weight of total monomer is added during the second stage of the polymerization.

7. An emulsion according to claim 6 prepared by a process such that no more than 50% by weight of total monomers is added during the second stage of the polymerization.

8. An emulsion according to claim 7 prepared according to a process in which no more than 25% by weight of total monomer is added during the second stage of polymerization.

9. An emulsion according to claim 8 in which the reaction product comprises from about 0.2 to about 10% by weight of the total monomer.

10. An emulsion according to claim 9 in which the first stage monomer mixture comprises in major part a monomer or monomers selected from the ($C_1$-$C_8$)alkyl esters of acrylic and methacrylic acid.

11. An emulsion according to claim 10 prepared according to a process in which the second stage monomer mix comprises in major part at least one monomer selected from styrene, alpha-methyl styrene, and vinyltoluene.

12. An emulsion according to claim 11 in which the reaction product is the condensation product of a compound selected from 1,2,4-benzenetricarboxylic anhydride, 1,2,4,5-benzenetetracarboxylic anhydride, 1,2,4-benzenetricarboxylic acid, and 1,2,4,5-benzenetetracarboxylic acid, and a compound selected from the group consisting of hydroxyethyl methacrylate, hydroxyethyl acrylate, hydroxypropyl methacrylate, hydroxypropyl acrylate, vinylbenzyl alcohol, and allylalcohol.

13. An emulsion according to claim 12 in which the reaction product is the condensation product of 1,2,4-benzenetricarboxylic anhydride and hydroxyethyl methacrylate.

14. An emulsion polymer comprising a minor portion by weight of a residue of the reaction product of
at least one compound selected from the carboxylic acids of benzene, naphthalene, biphenyl, and the ($C_5$-$C_{10}$)cycloalkenes, substituted with up to two substituents selected from —OH, —SH, —($C_1$-$C_6$)alkyl-OH and —($C_1$-$C_4$)alkyl-SH, optionally substituted with up to two substituents selected from halogen, nitro, cyano, ($C_1$-$C_6$)alkyl, ($C_3$-$C_6$)alkenyl, amino, —$CO_2H$, mono($C_1$-$C_4$)alkylamino and di($C_1$-$C_4$)alkylamino,
and an ethylenically unsaturated comonomer bearing a carboxylic acid or carboxylic acid anhydride group, provided that no residue bear fewer than two nor more than four carboxylic acid groups and
provided that at least some portion of the compound or compounds bearing such residue or residues is not present in the monomer mixture in which polymerization is first initiated.

15. An aqueous latex of a water insoluble vinyl addition polymer prepared by two-stage emulsion polymerization comprising a minor portion by weight of the polymer of a residue of a condensation product, comprising from about 0.2% to about 10% by weight of the total monomers, of bicyclo-[2,2,2]oct-7-ene-2,3,5,6-tetracarboxylic dianhydride and a hydroxy($C_1$-$C_4$)alkyl (meth)acrylate, wherein no more than 25% by weight of the total monomer is added during the second stage of the polymerization and wherein the first stage monomer mixture comprises in major part of a monomer or monomers selected from ($C_1$-$C_8$)alkyl esters of acrylic and methacrylic acid, and in which the second stage monomer mixture comprises in major part at least one monomer selected from styrene, alpha-methyl styrene and vinyl toluene, and provided that at least some portion of the compound or compounds bearing such residue or residues is not present in the monomer mixture in which polymerization is first initiated.

* * * * *